United States Patent [19]
Ichikawa et al.

[11] Patent Number: 6,077,808
[45] Date of Patent: Jun. 20, 2000

[54] EXHAUST GAS PURIFYING CATALYST AND PROCESS OF PRODUCING THE SAME

[75] Inventors: Satoshi Ichikawa; Takashi Takemoto; Masahiko Shigetsu; Kazuo Misonoo, all of Hiroshima, Japan

[73] Assignee: Mazda Motor Corporation, Hiroshima, Japan

[21] Appl. No.: 09/130,456

[22] Filed: Aug. 7, 1998

[30] Foreign Application Priority Data

Aug. 8, 1997 [JP] Japan ................................ 9-227557

[51] Int. Cl.$^7$ ............... B01J 23/10; B01J 23/28; B01J 23/44; B01J 23/63
[52] U.S. Cl. ............... 502/304; 502/300; 502/302; 502/527.14; 502/527.24
[58] Field of Search ............... 502/300, 302, 502/304, 527.14, 527.24

[56] References Cited

U.S. PATENT DOCUMENTS

| | | | |
|---|---|---|---|
| 4,714,694 | 12/1987 | Wan et al. | 502/304 |
| 4,760,044 | 7/1988 | Joy, III et al. | 502/303 |
| 4,782,038 | 11/1988 | Gandhi et al. | 502/304 |
| 4,839,146 | 6/1989 | Cho et al. | 423/213.5 |
| 5,057,483 | 10/1991 | Wan | 502/304 |
| 5,248,650 | 9/1993 | Sekiba et al. | |
| 5,462,907 | 10/1995 | Farrauto et al. | 502/304 |
| 5,491,120 | 2/1996 | Voss et al. | 502/304 |
| 5,494,878 | 2/1996 | Murakami et al. | 502/304 |
| 5,597,771 | 1/1997 | Hu et al. | 502/304 |

FOREIGN PATENT DOCUMENTS

| | | |
|---|---|---|
| 0 558 159 | 9/1993 | European Pat. Off. . |
| 40 04 572 | 8/1990 | Germany . |
| 2-15253 | 6/1985 | Japan . |
| 60-110335 | 6/1985 | Japan . |

*Primary Examiner*—Elizabeth Wood
*Attorney, Agent, or Firm*—Nixon Peabody LLP; Donald R. Studebaker

[57] ABSTRACT

An exhaust gas purifying catalyst is produced by, after contacting a ceria powder with a palladium solution and burning the ceria powder to support the palladium on the ceria powder, forming a coating layer of the ceria powder on a catalyst support and impregnating the coating layer with a solution of cerium and burning it to provide palladium oxide particles fixed around ceria particles and a ceria coating so as to cover the palladium particles.

11 Claims, 19 Drawing Sheets

EXHAUST GAS PURIFYING CATALYST AND PROCESS OF PRODUCING THE SAME

BACKGROUND OF THE INVENTION

1. Field of the Invention

The invention relates to an exhaust gas recirculation catalyst and a process of producing the exhaust gas purifying catalyst.

2. Description of the Related Art

There has been known an exhaust gas purifying catalyst comprising a layer of a mixture of alumina powder supporting ceria and ceria powder coated on a catalyst support member and one noble metal selected from a group of platinum (Pt), rhodium (Rh) and palladium (Pd) supported by the layer and a process of making the exhaust gas purifying catalyst. Such an exhaust gas purifying catalyst and a process making the same are disclosed in, for example, Japanese Unexamined Patent Publication No. 60-110335 and Japanese Patent Publication No. 2-15253. The exhaust gas purifying catalyst has been made with an intention to prevent a reduction in specific surface area of alumina powder and to provide improvement of dispersibility of a noble metal on the alumina powder by reducing an amount of ceria supported directly on the alumina powder.

It has also known in the art to utilize an oxygen ($O_2$) storage effect to expand the A/F window of an three-way catalyst. The term "A/F window" means an optimum range of air-fuel (A/F) ratio on either side of the stoichiometric value for engine operation. The above mentioned publications teach that the amount of ceria supported on ceria is reduced in view of preventing a reduction in specific surface area of an alumina powder and a ceria powder is added after supporting a noble metal on an alumina powder with an effect of ensuring a sufficient amount of ceria necessary for the catalyst to provide a desired oxygen storage effect.

While the prior art teaches that the exhaust gas purifying catalyst is effective to prevent a reduction in specific surface area of an alumina powder, however, there is not any suggestion for improving an interaction between palladium oxide and cerium oxide. In order to enhance catalytic function of the palladium oxide with an oxygen storage effect of the cerium oxide, it is necessary that the cerium oxide is suitably dispersed around the palladium oxide. However, simply mixing a ceria powder with an alumina powder after supporting a noble metal on the alumina powder does not secure it that a noble metal is dispersed in close proximity to ceria powder so as to cause cerium oxide to present a desired oxygen storage effect.

SUMMARY OF THE INVENTION

It is an objective of the invention to provide an exhaust gas purifying catalyst which captures large hydrocarbons in exhaust gases and crack or modifies them to higher active hydrocarbons suitable as a reductant.

BRIEF DESCRIPTION OF THE DRAWINGS

The foregoing and other objects and features of the present invention will be clearly understood from the following detailed description of preferred embodiments when read in conjunction with the accompanying drawings wherein the abbreviation "CA" indicates a ceria powder, and in which.

DETAILED DESCRIPTION OF THE PREFERRED EMBODIMENT

Figure 1:
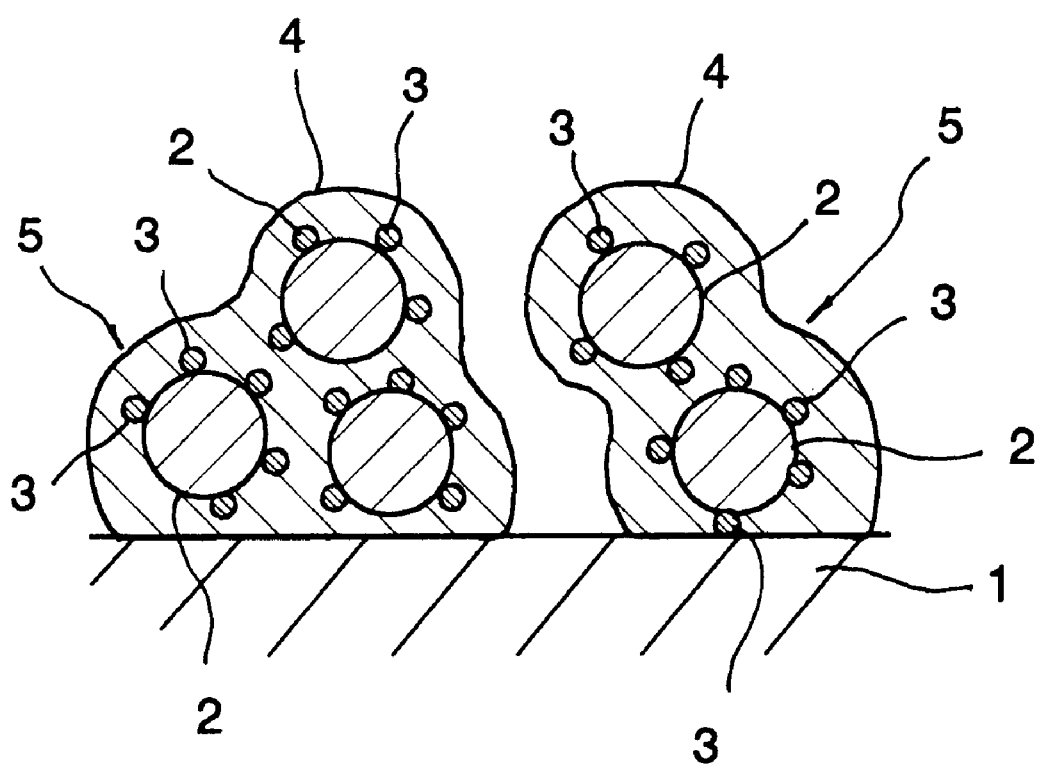
FIG. 1 is a schematic illustration of an exhaust gas purifying catalyst in accordance with an embodiment of the invention.

Referring to the drawings in detail and, in particular, to FIG. 1 showing a catalyst for purifying exhaust gas from an automobile engine, the catalyst comprises a cordierite honeycomb bed 1 and catalyst particles 5 supported by the cordierite honeycomb bed 1. Each catalyst particle 5 consists of a ceria particle 2 with palladium oxide particles 3 dispersed around and supported on the ceria particle 2. A ceria coating 4 is formed on the ceria particle to cover the palladium oxide particles 3. Although not shown in FIG. 1, the honeycomb bed 1 supports another catalyst particles dispersed thereon. The other catalyst particle consists of an active alumina particle with palladium oxide particles dispersed around and supported on the active alumina particle. A ceria coating is formed on the active alumina particle to cover the palladium oxide particles 3.

An exhaust gas purifying catalyst is prepared by an impregnation process. A slurry is prepared by mixing 1 g alumina powder, 1 g ceria powder, 1.64 g (4.53 weight %) of dinitrodiamin palladium solution and a binder with 10 ml of water. A cordierite honeycomb bed 1 is immersed in the resulting mixture slurry and drawn up to form a layer of the mixture slurry on the honeycomb bed 1. After removing an excessive part of the mixture slurry from the cordierite honeycomb bed 1, the mixture layer is dried and burnt. After cooling the cordierite honeycomb bed 1 with the mixture layer formed thereon, the mixture layer is impregnated with a solution prepared by dissolving 1 g cerium nitrate in 3 ml of water and subsequently burnt to provide the exhaust gas purifying catalyst.

The exhaust gas purifying catalyst may be prepared by a vaporization-dry process. Specifically, a slurry is prepared by mixing 2 g alumina powder, 2 g ceria powder, 1.64 g (4.53 weight %) of dinitrodiamin palladium solution with 10 ml of water and heated until solidified. The solid mixture is crushed to particles. A mixture slurry is made by adding the particles and a binder into 10 mg water. A cordierite honeycomb bed 1 is immersed in the resulting mixture slurry and drawn up to form a layer of the mixture slurry on the honeycomb bed 1. After removing an excessive part of the mixture slurry from the honeycomb bed 1, the mixture layer is dried and burnt. After cooling the honeycomb bed 1, the mixture layer is impregnated with a solution prepared by dissolving 2 g cerium nitrate in 3 ml of water and subsequently burnt again to provide the exhaust gas purifying catalyst.

According to the processes, the exhaust gas purifying catalyst contains ceria powder and ceria yielded from cerium nitrate. Tests were conducted to demonstrate the effect on the catalytic activity of various amounts of a ceria powder relative to the total amount of ceria. Four sample catalysts and one comparative catalyst were prepared which differed in the amount of ceria powder. The weight ratio of the amount of ceria powder relative to the total amount of ceria in the support was 20, 40, 60 and 80% for the sample catalyst, respectively and 100% for the comparative catalyst. Each sample catalyst is prepared by the impregnation process. These catalysts are referred to as a CA-20 sample catalyst, a CA-40 sample catalyst, a CA-60 sample catalyst, a CA-80 sample catalyst and a CA-100 comparative catalyst, respectively. The CA-20 sample catalyst was prepared by using 3.0 g alumina powder, 0.6 g ceria powder, 1.64 g (4.53 weight %) of dinitrodiamin palladium solution, and 1.72 g cerium nitrate. The weight of a dried catalyst layer was 1.8 g per 25 ml of honeycomb bed. The ratio of alumina to ceria of the resulting sample catalyst was 1:1, and the palladium supported on the honeycomb bed was 1.5 g/L. Two times of burning of the mixture layer were carried out at 500° C. for two hours. Measurements of T-50 temperature for nitrogen oxides (NOx), hydrocarbons (HC) and carbon monoxide (CO) were made to evaluate low temperature activity of the respective sample catalysts. The term "T-50 temperature" as used herein shall mean and refer to the converter inlet temperature at which the catalyst presents 50% of maximum catalyst conversion efficiency. Further, measurements of C-400 and C-500 conversion efficiency for nitrogen oxides (NOx), hydrocarbons (HC) and carbon monoxide (CO) were made to evaluate high temperature activity of the respective sample catalysts. The terms "C-400 conversion activity" and "C-500 conversion activity" as used herein shall mean and refer to the catalytic conversion efficiency at converter inlet temperatures of 400° C. and 500° C., respectively. A simulated exhaust gas was controlled to change an air/fuel ratio with fluctuations of 0.9 on both sides of the stoichiometric air/fuel ratio 14.7. The simulated exhaust gas had the following composition:

$CO_2$: 13.9%
$O_2$: 0.6%
CO: 0.6%
$H_2$: 0.2%
$O_2$: 0.6%
$C_3H_6$: 0.056%
NO: 0.1%
$N_2$: the reminder In order to evaluate heat resistance, each sample catalyst was tested after exposure to an atmosphere at 1000° C. for 24 hours.

Figure 2:
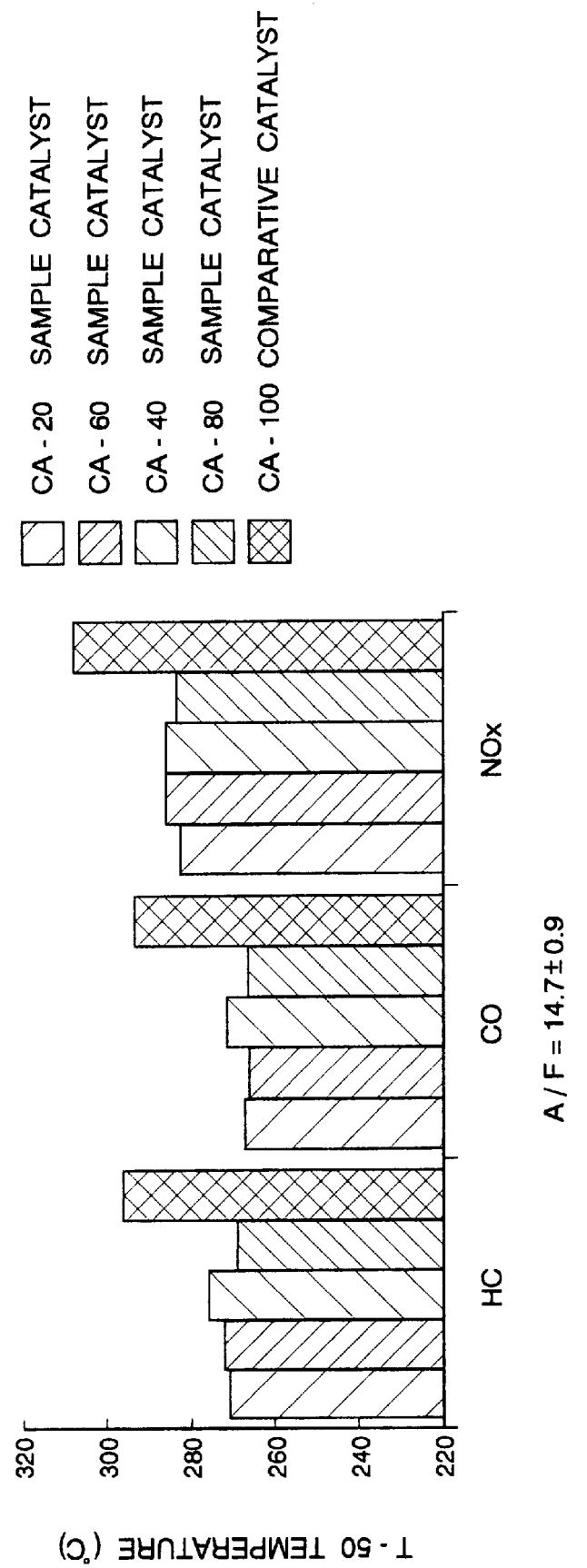
FIG. 2 is a graphical diagram showing T-50 temperature of sample and comparative catalysts containing 20, 40, 60, 80 and 100% ceria powder.

FIG. 2 shows T-50 temperature of the respective sample catalysts. As apparent in FIG. 2, the sample catalyst which contains powder ceria forming a part of the whole of ceria component, presents a lower T-50 temperature than the comparative catalyst which contains a ceria powder for the whole of ceria. This proves that the catalyst of the invention improves the low temperature activity. This is because the palladium oxide is covered by the ceria powder and the ceria nitrate coating, so that the oxygen storage effect of ceria effectively acts on the palladium oxide.

Figure 3:
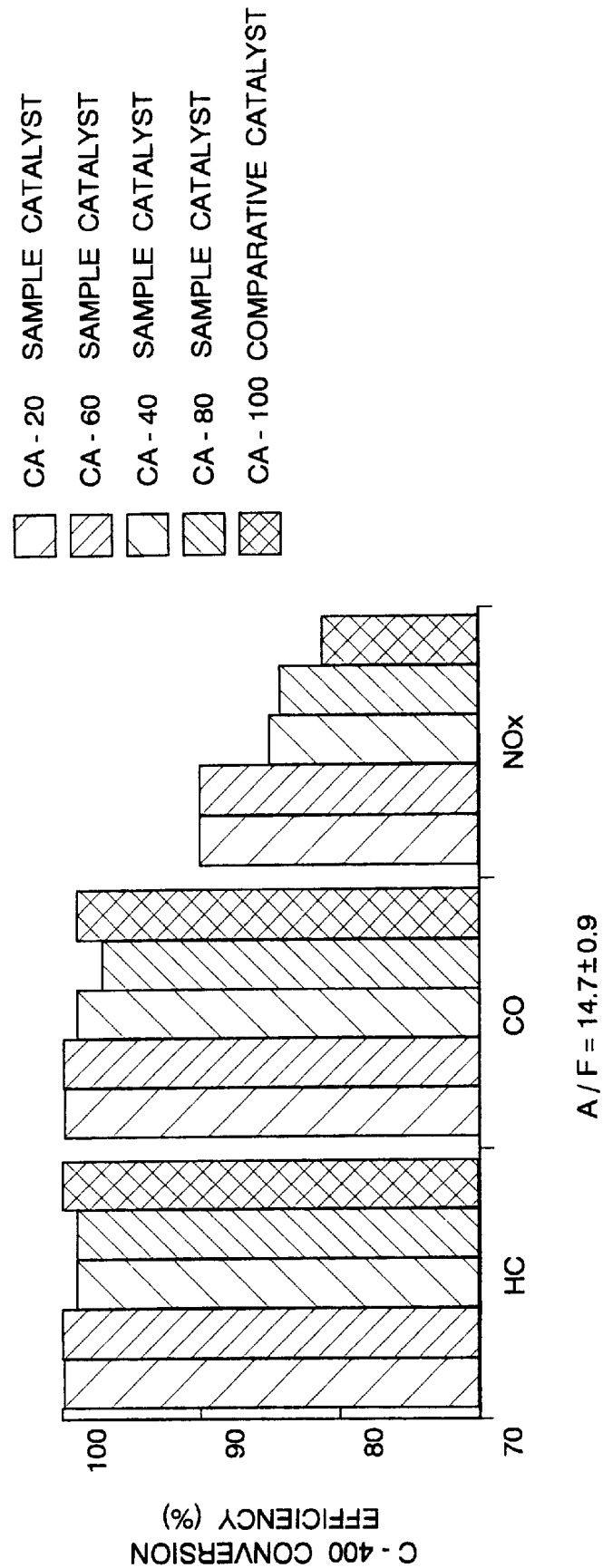
FIG. 3 is a graphical diagram showing C-400 conversion efficiency for harmful NOx, HC and CO emissions of the sample and comparative catalysts containing 20, 40, 60, 80 and 100% ceria powder.
Figure 4:
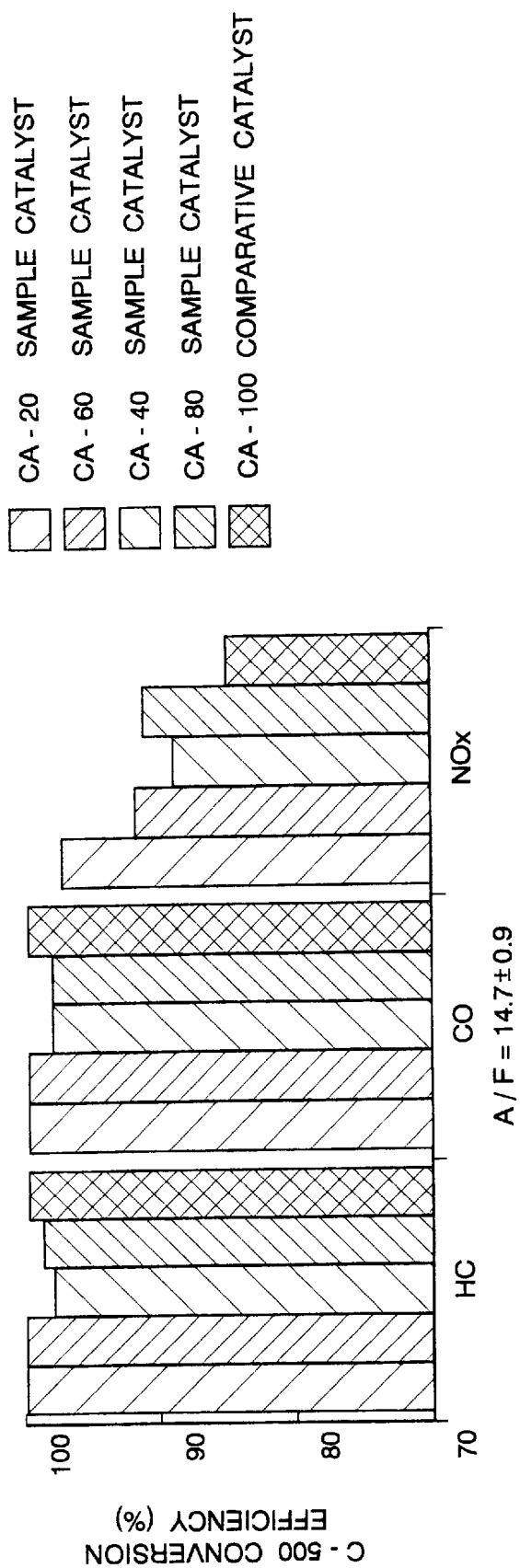
FIG. 4 is a graphical diagram showing C-500 conversion efficiency for harmful NOx, HC and CO emissions of the sample and comparative catalysts containing 20, 40, 60, 80 and 100% ceria powder.

FIGS. 3 and 4 show C-400 and C-500 conversion efficiency of the respective sample catalysts. It is proved that, while there is no difference in HC and CO conversion efficiency between the sample and comparative catalysts, each sample catalysts presents higher NOx conversion efficiency than the comparative catalyst. It is also proved that the NOx conversion efficiency lowers as the ceria powder content increases.

Figure 5:
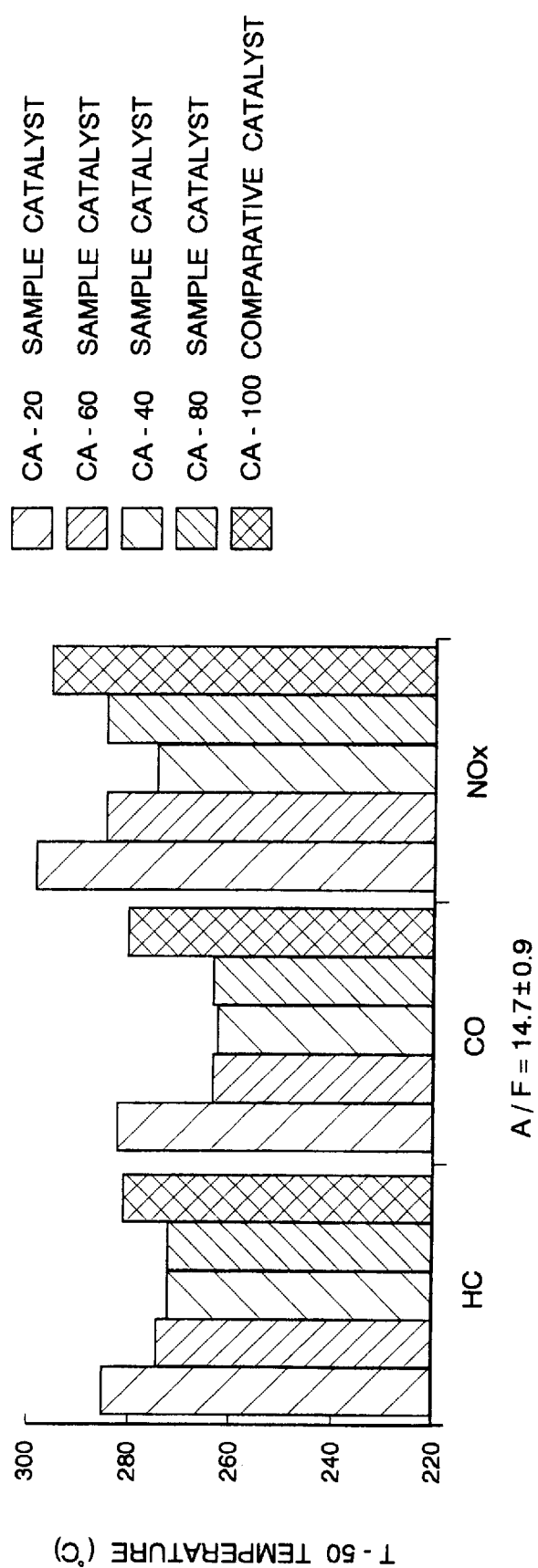
FIG. 5 is a graphical diagram showing T-50 temperature of sample and comparative catalysts containing 0, 10, 20, 30 and 100% ceria powder.
Figure 6:
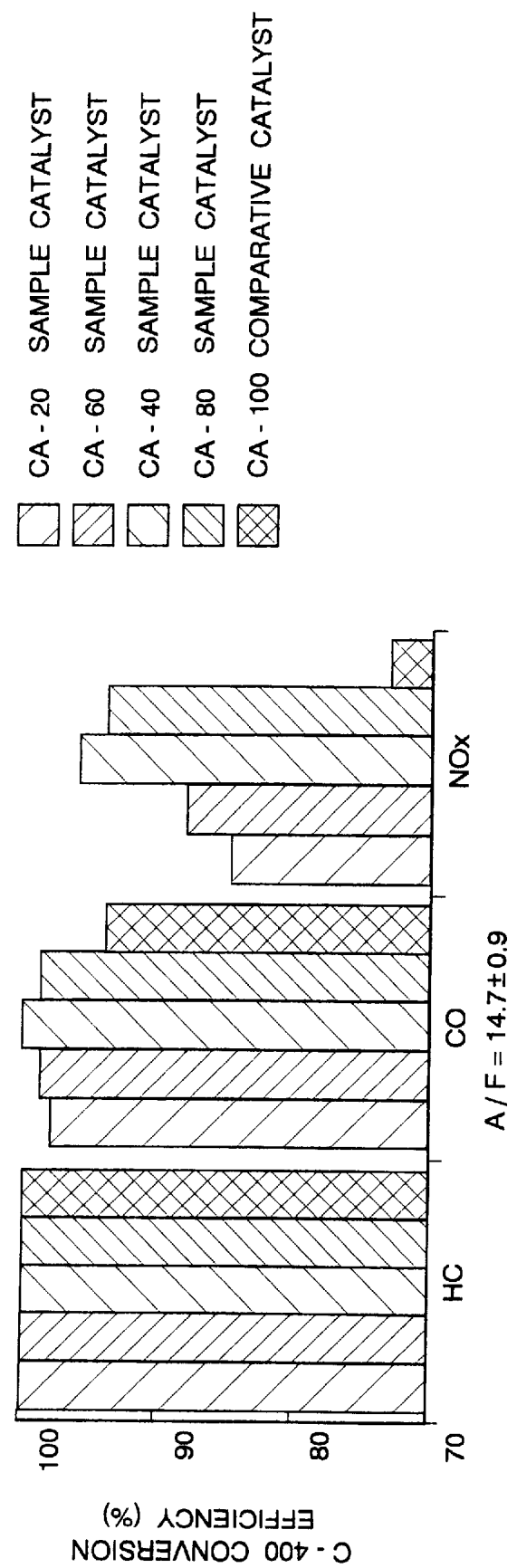
FIG. 6 is a graphical diagram showing C-400 conversion efficiency for harmful NOx, HC and CO emissions of the sample and comparative catalysts containing 0, 10, 20, 30 and 100% ceria powder.
Figure 7:
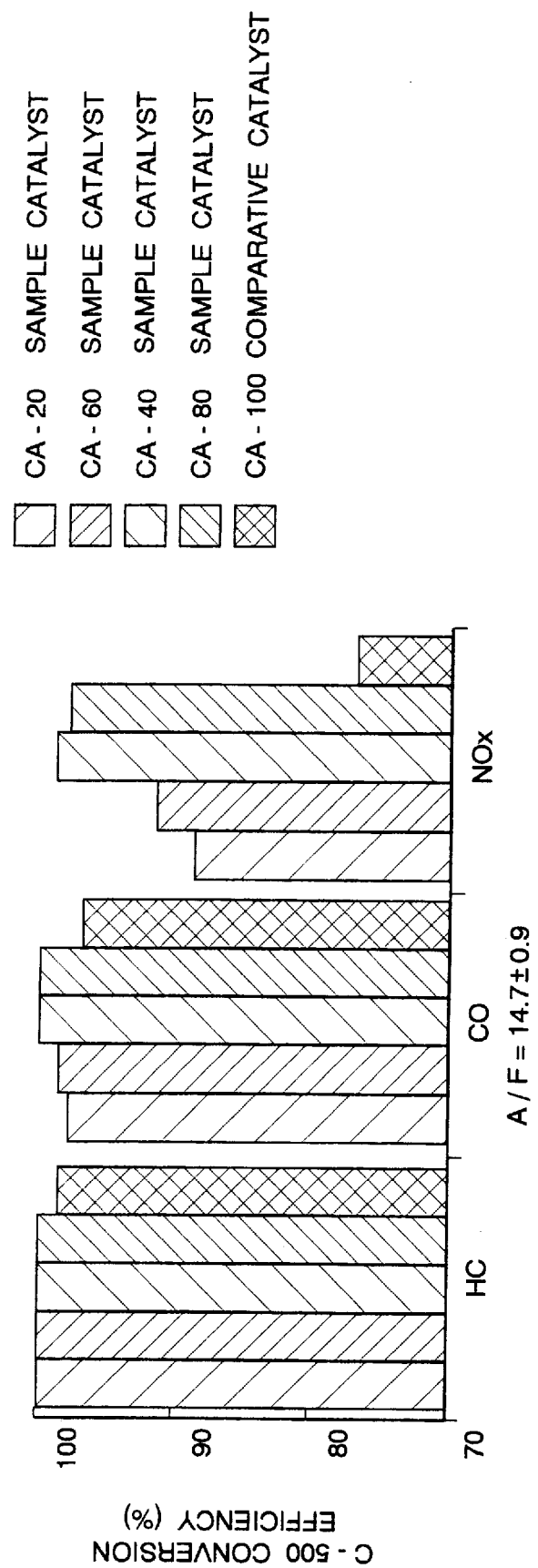
FIG. 7 is a graphical diagram showing C-500 conversion efficiency for harmful NOx, HC and CO emissions of the sample and comparative catalysts containing 0, 10, 20, 30 and 100% ceria powder.

In order to optimize the ceria powder content of catalyst, the same tests were conducted for four sample catalysts and one comparative catalyst. The sample catalysts prepared had weight ratios of ceria powder relative to the total amount of ceria in the support of 0, 10, 20 and 30%, respectively, and the comparative catalyst had 100% ceria powder. These catalysts are referred to as a CA-0 sample catalyst, a CA-10 sample catalyst, a CA-20 sample catalyst, a CA-30 sample catalyst and a CA-100 comparative catalyst, respectively. The results are shown in FIGS. 5 through 7. It is proved that the CA-10, CA-20 and CA-30 sample catalysts present similarly low T-50 temperatures and the CA-20 and CA-30 sample catalysts present NOx conversion efficiency significantly higher than the other catalysts. Accordingly, the optimum ceria powder content by weight of the exhaust gas purifying catalyst is proved to be 10 to 30% and, in particular, 20 to 30% in view of NOx conversion efficiency.

Figure 8:
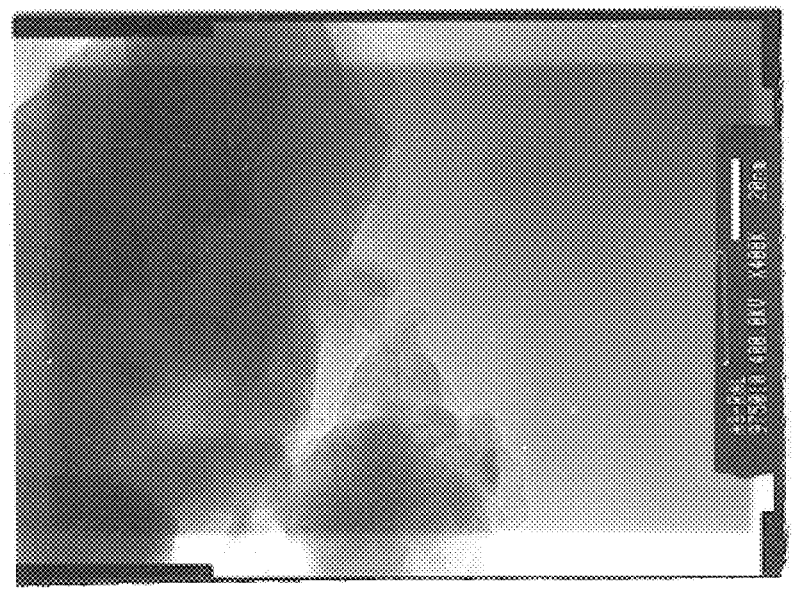
FIG. 8 is a photomicrograph showing of a particulate structure of a sample catalyst.
Figure 9:
FIG. 9 a photomicrograph showing a particulate structure of a comparative catalyst.

Regarding the CA-20 sample catalyst and the CA-100 comparative catalyst, photomicrographs of parts of ceria powder of the respective catalysts were compared to demonstrate the effect on catalyst performance of catalyst particles. FIGS. 8 and 9 are photomicrographs of the sample and comparative catalysts exposed to an atmosphere at 1000° C. for 24 hours which were taken by a transmission electron microscopy. As seen in FIG. 9, a large circular part appearing on the right side is a ceria particle, and a small circular part on the ceria particle is a palladium oxide particle. On the other hand, as seen in FIG. 8, a relatively dark, large circular part appearing on the left side is a ceria particle, and a light part appearing in close proximity to the ceria particle is a ceria coating. Small parts around the ceria coating is a palladium oxide particle. The photomicrograph of FIG. 8 demonstrates that the palladium oxide particle is covered by the ceria coating. The existence of the ceria coating yields the difference in catalytic activity. Identification of chemical elements on a photomicrograph may be achieved by an energy dispersion X-ray detector or made on the basis of a lattice pattern. In either case, the sample and comparative catalysts are distinctly discriminated.

Figure 10:
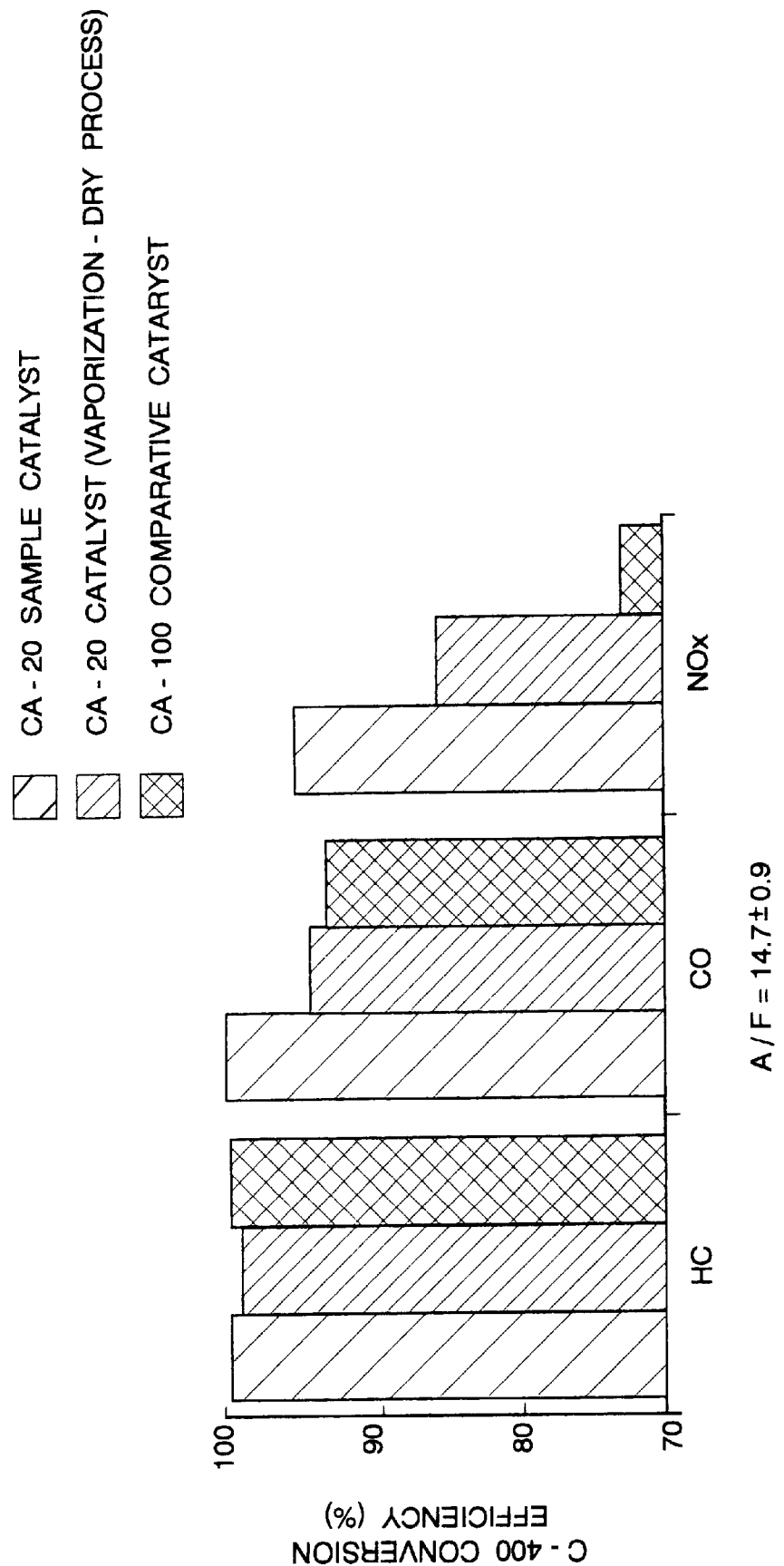
FIG. 10 is a graphical diagram showing C-400 conversion efficiency for harmful NOx, HC and CO emissions of sample catalysts prepared by different processes of the invention.
Figure 11:
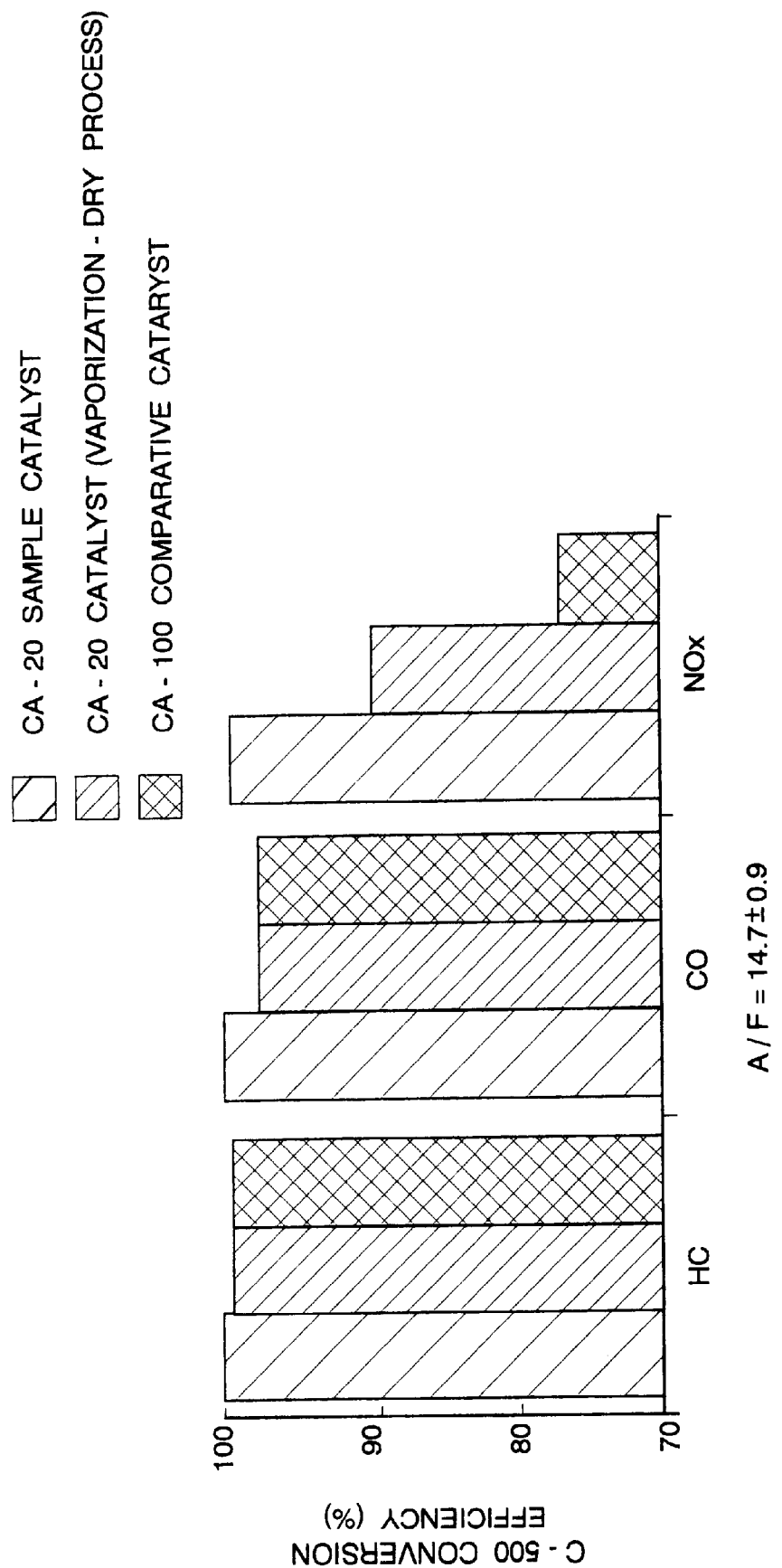
FIG. 11 is a graphical diagram showing C-500 conversion efficiency for harmful NOx, HC and CO emissions of the sample and comparative catalysts prepared by different processes.

Further, tests were conducted to demonstrate the effect on catalyst performance of processes making the catalysts. The CA-20 sample catalysts which presented the highest catalytic activity were prepared by the impregnation process and the vaporization-dry process, respectively. FIGS. 10 and 11 show C-400 and C-500 conversion efficiency, respectively. Both sample catalysts were prepared by using 3.0 g alumina powder, 0.6 g ceria powder, 1.64g (4.53 weight %) of dinitrodiamin palladium solution, and 1.7 g cerium nitrate. As seen in FIGS. 10 and 11, it is proved that the catalyst prepared by the vaporization-dry process present slightly lower C-400 and C-500 conversion efficiency than that prepared by the impregnation process and, however, has higher C-400 and C-500 conversion efficiency than the comparative catalyst. The difference in NOx conversion efficiency is significant in particular. As a result, the vaporization-dry process is proved to be useful to make the exhaust gas purifying catalyst of the invention.

Further, the same tests were conducted to demonstrate the effect on the catalytic activity of producing processes. Four sample catalysts, namely C-20, CA-40, CA-60 and CA-80 sample catalysts, were prepared by a prior art process. Specifically, a ceria powder was impregnated with cerium nitrate so as to contain 5 weight % of an intended total amount of ceria and burnt. The resulting ceria containing alumina powder was mixed with ceria powder containing ceria of 95 weight % of the intended total amount and water to provide a mixture slurry. The mixture slurry was coated on a honeycomb bed and burnt. The resulting mixture layer was impregnated with a dinitrodiamin palladium solution and further burnt as a catalyst. The weight ratio of alumina powder, ceria and palladium of the resulting sample catalysts was the same as that of the CA-20 sample catalyst.

Figure 12:
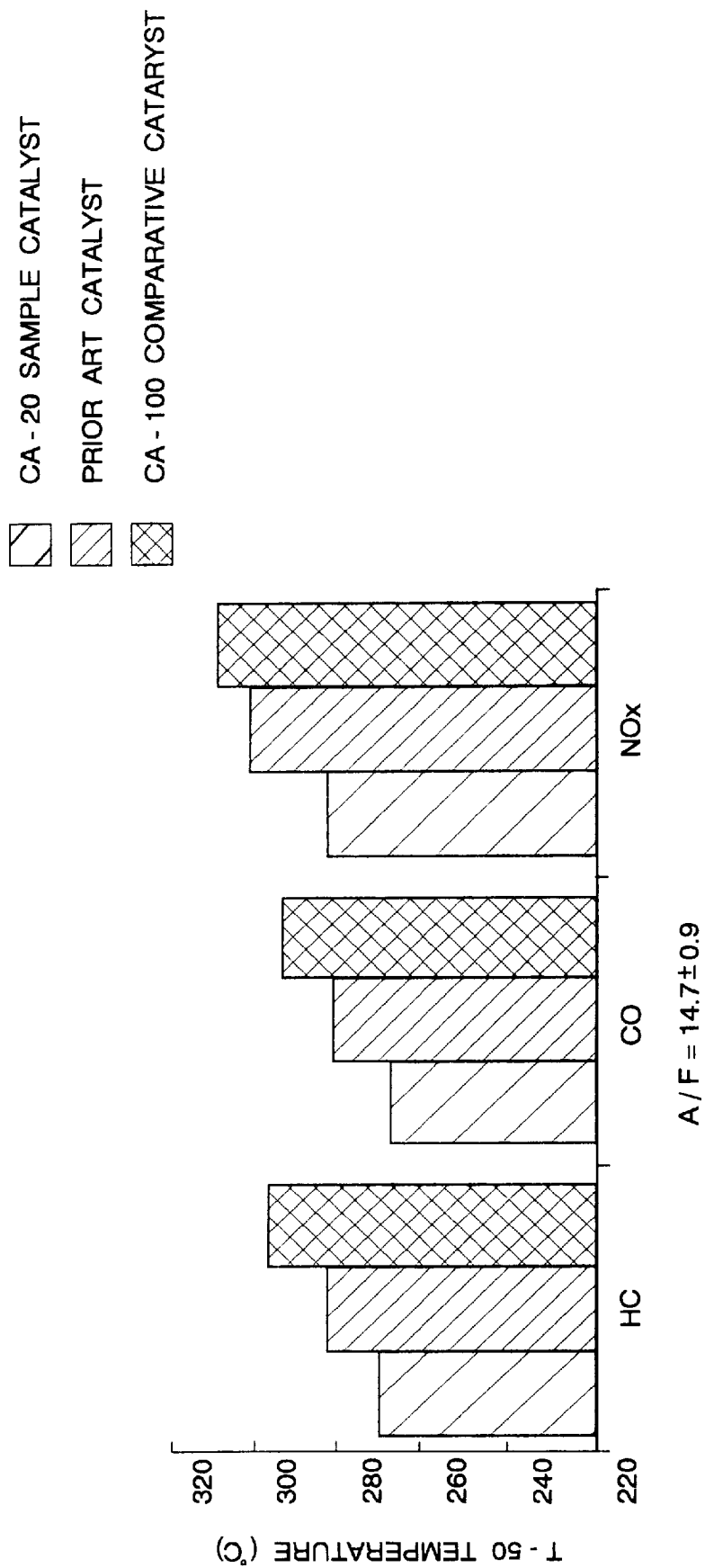
FIG. 12 is a graphical diagram showing T-50 temperature of sample catalysts prepared by the process of the invention and an prior art process.
Figure 13:
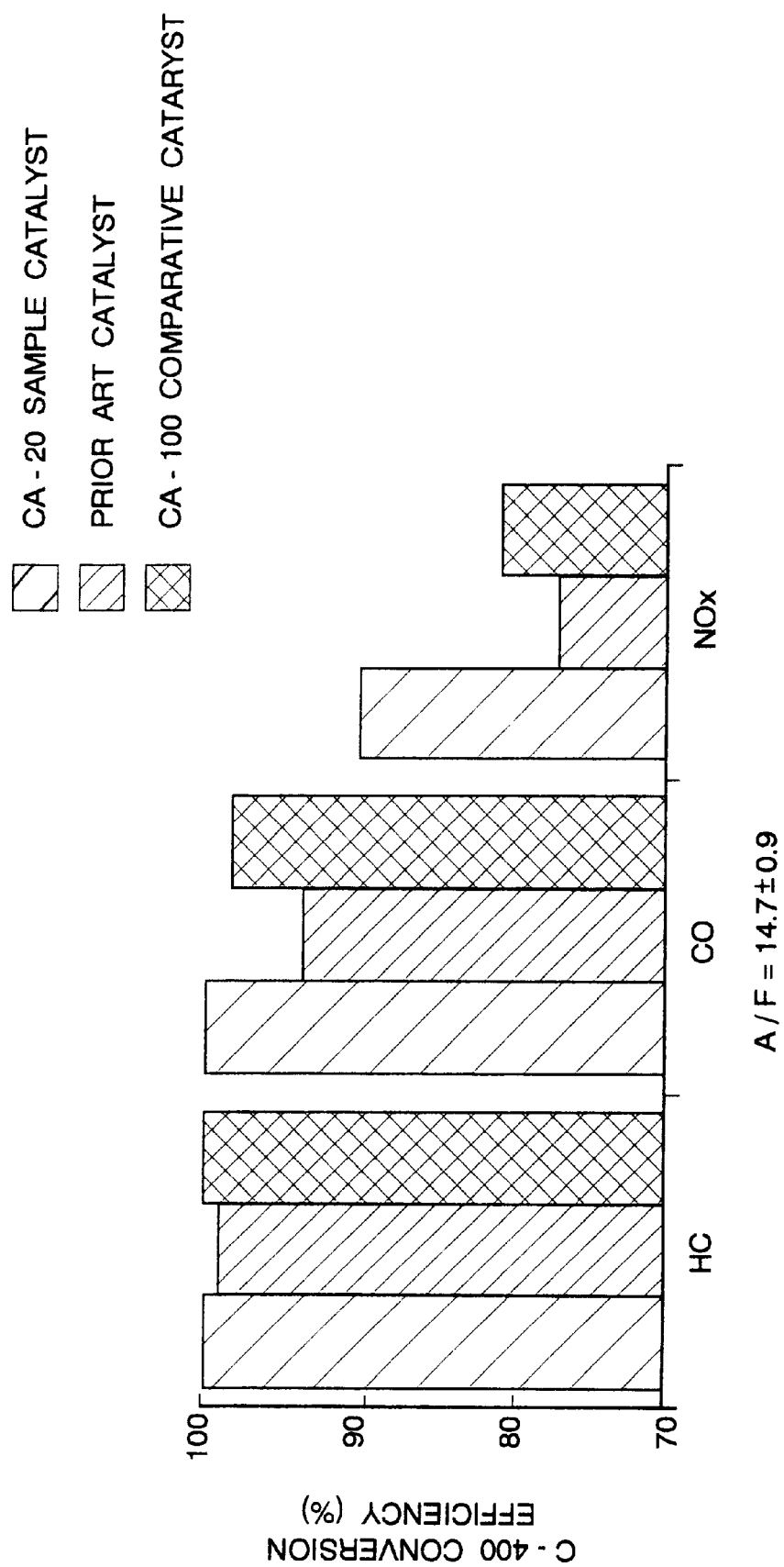
FIG. 13 is a graphical diagram showing C-400 conversion efficiency for harmful NOx, HC and CO emissions of the sample catalysts prepared by the process of the invention and an prior art process.
Figure 14:
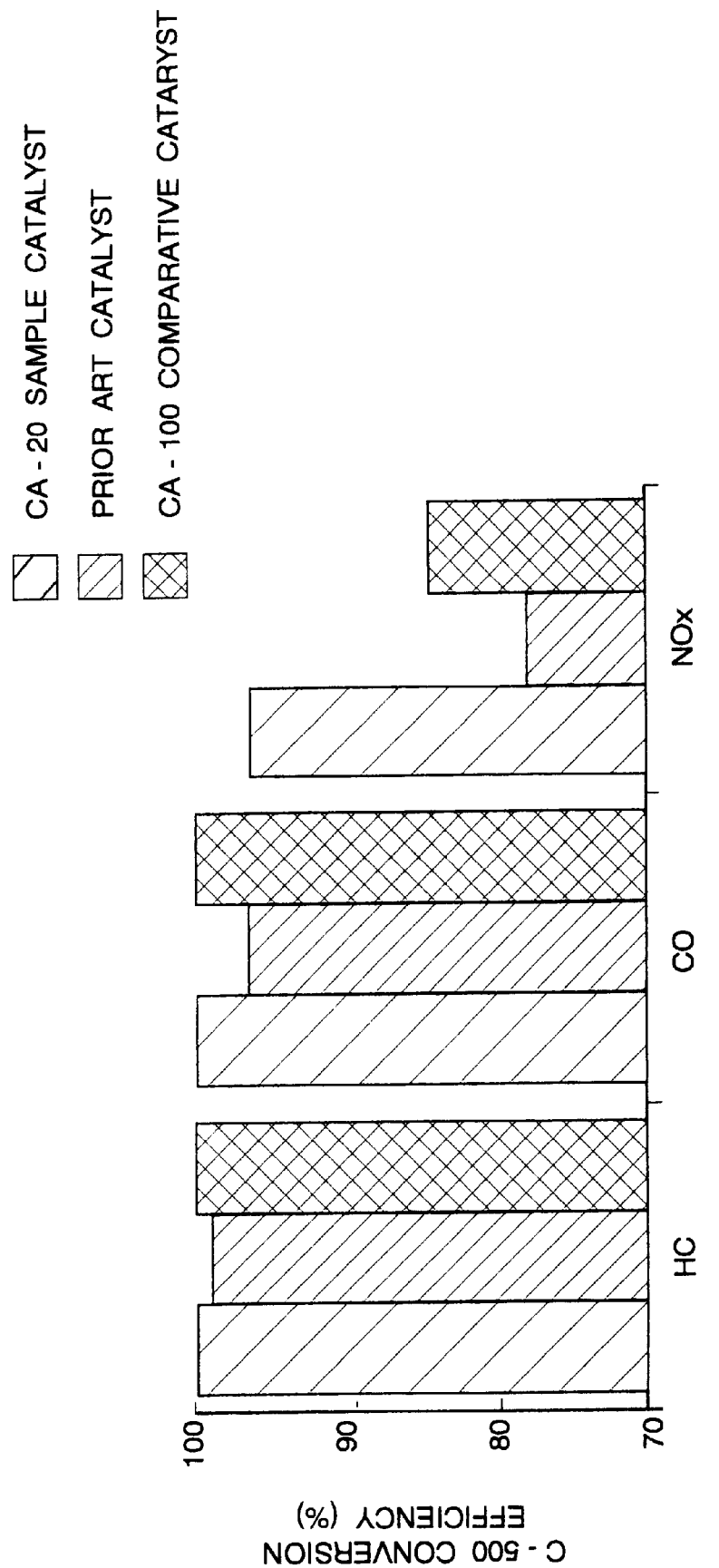
FIG. 14 is a graphical diagram showing C-500 conversion efficiency for harmful NOx, HC and CO emissions of the sample prepared by the process of the invention and an prior art process.

FIGS. 12 through 14 show T-50 temperature and C-400 and C-500 conversion efficiency, respectively, measured in the same manner as described above. As seen in FIG. 12, the sample catalysts present improved low temperature activity as compared with the CA-100 comparative catalyst and, however, lower T-50 temperatures than those of the sample catalysts made by the present invention. It can be thought that while the prior art process prevents a sharp decrease in specific surface area of the alumina powder and allows ceria and alumina particles to support palladium oxide particles thereon, however it does not form a ceria coating to cover the palladium oxide particles, which bears out usefulness of the process of the invention. As seen in FIGS. 13 and 14, the sample catalysts present lower C-400 and C-500 conversion efficiency than the CA-100 comparative catalyst. It can be thought that this is a result of a reduction in specific surface area of an alumina particle due to impregnation of alumina powder with cerium nitrate and burning the alumina powder.

The same tests were conducted to demonstrate the effect on catalyst performance of noble metals. CA-20 sample catalyst and CA-100 comparative catalyst were prepared each of which contained palladium (Pd), platinum (Pt) and rhodium (Rh) as noble metals by the impregnation process. The weight ratio of palladium (Pd), platinum (Pt) and rhodium (Rh) was 1:7:3 and the total weight content was 1.3 g/L. The two catalysts were exposed to an atmosphere at 1000° C. for 24 hours.

Figure 15:
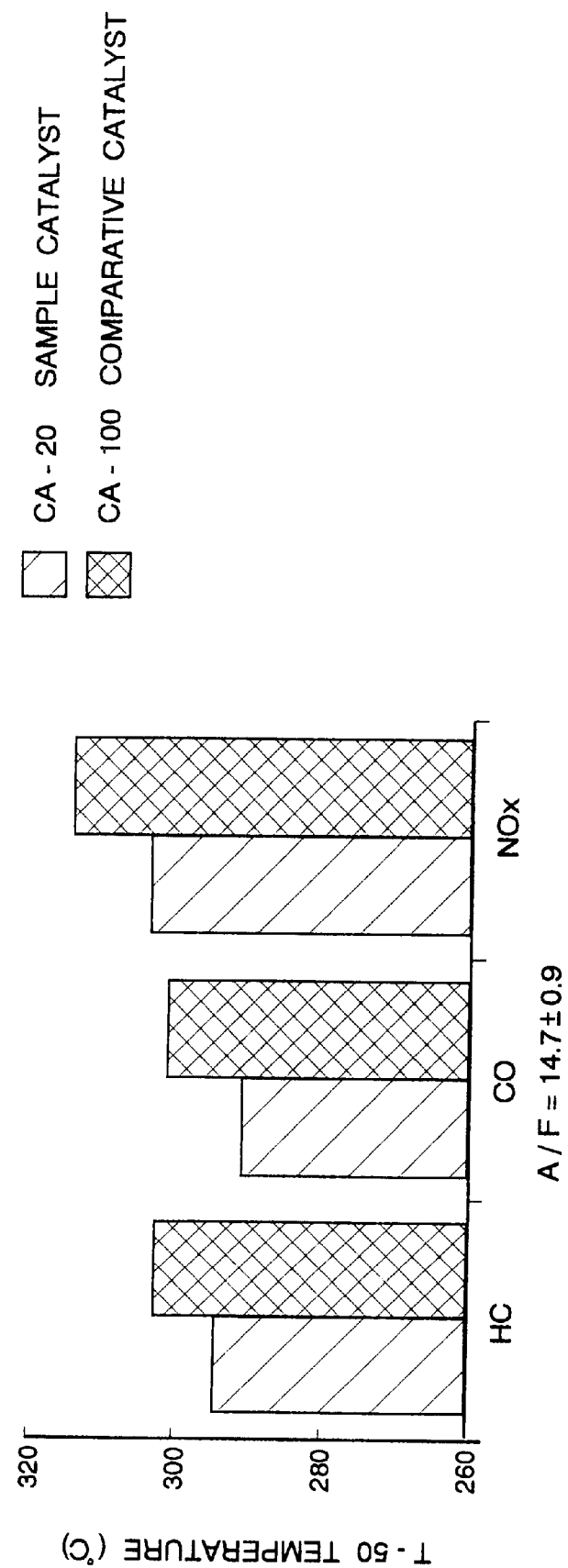
FIG. 15 is a graphical diagram showing T-50 temperature of sample and comparative catalysts containing Pt, Pd and Rh as noble metals.
Figure 16:
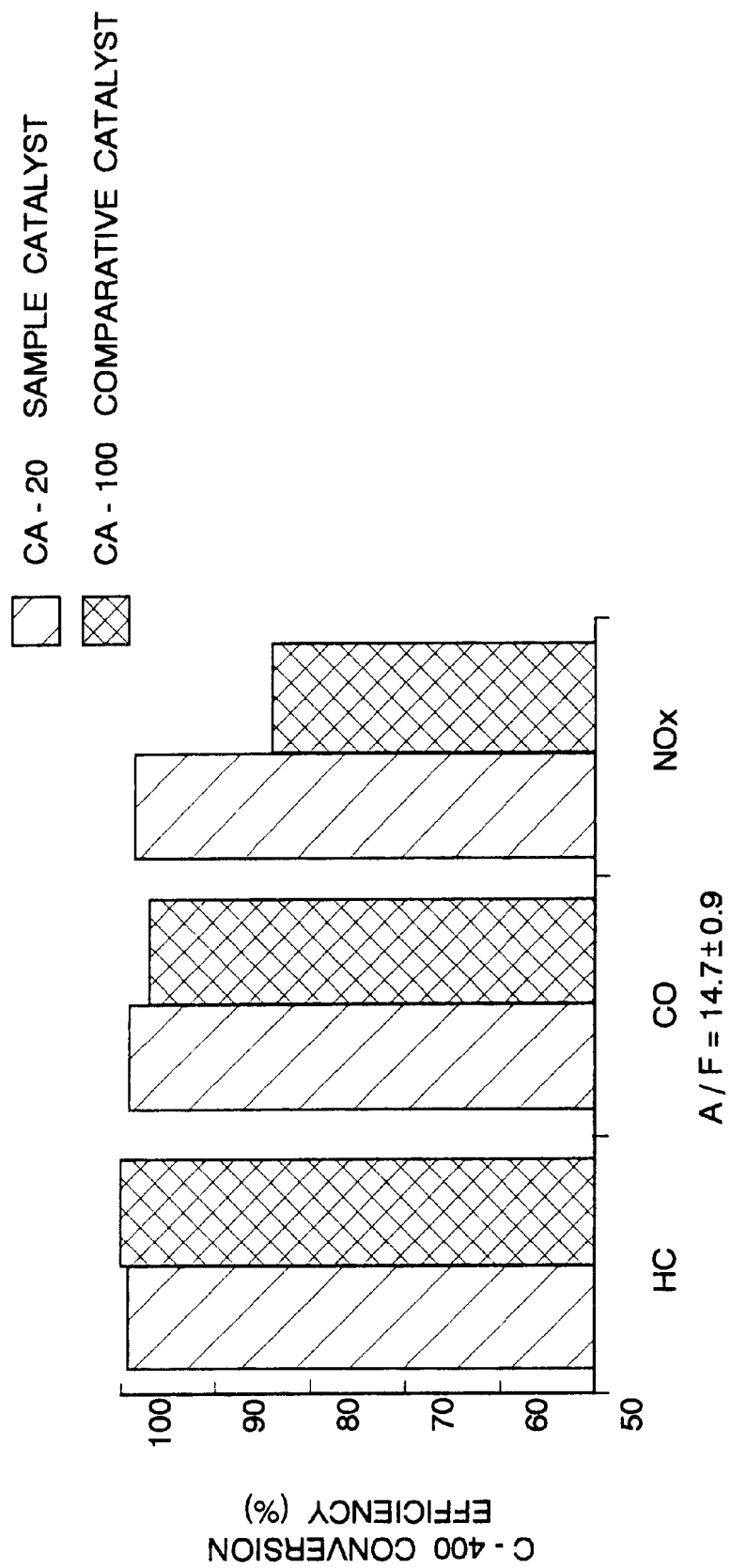
FIG. 16 is a graphical diagram showing C-400 conversion efficiency of the sample and comparative catalysts containing Pt, Pd and Rh as noble metals.
Figure 17:
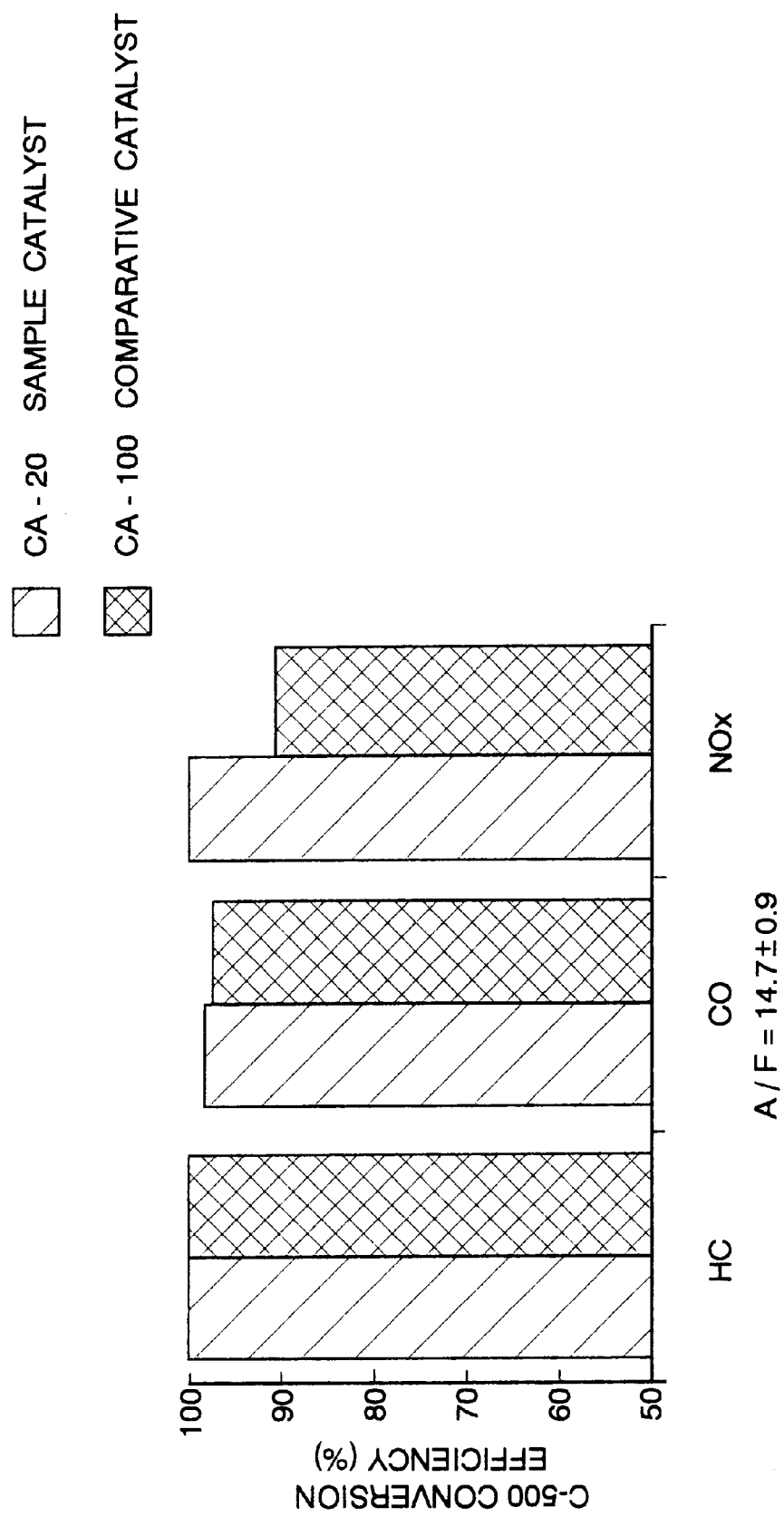
FIG. 17 is a graphical diagram showing C-500 conversion efficiency of the sample and comparative catalysts containing Pt, Pd and Rh as noble metals.

FIGS. 15–17 show T-50 temperature and C-400 and C-500 conversion efficiency, respectively. The CA-20 sample catalyst presents lower T-50 temperatures for all of hydrocarbons (HC), carbon monoxide (CO) and nitrogen oxides (NOx) than the CA-100 comparative catalyst. While the CA-20 sample catalyst presents C-400 and C-500 conversion efficiency for hydrocarbons (HC) almost equal to or slightly lower than the CA100 comparative catalyst and, however, presents significantly higher C-400 and C-500 conversion efficiency for both carbon monoxide (CO) and nitrogen oxides (NOx) the CA100 comparative catalyst. This proves that the utilization of platinum (Pt) and rhodium (Rh) in combination with palladium (Pd) provides effective improvement of T-50 temperature and C-400 and C-500 conversion efficiency.

Accordingly, examinations were made to reveal the effect on the catalyst of platinum (Pt) and rhodium (Rh) as noble metals. CA-20 sample catalyst and CA-100 comparative catalyst were prepared each of which contained platinum (Pt) and rhodium (Rh) as noble metals by the impregnation process. The weight ratio of platinum (Pt) and rhodium (Rh) was 5:3 and the total weight content was 1.6 g/L. The two catalysts were exposed to an atmosphere at 1000° C. for 24 hours. T-50 temperature and c-400 and C-500 conversion efficiency were measured with the test conditions as above. The result is shown in FIGS. 18–20.

Figure 18:
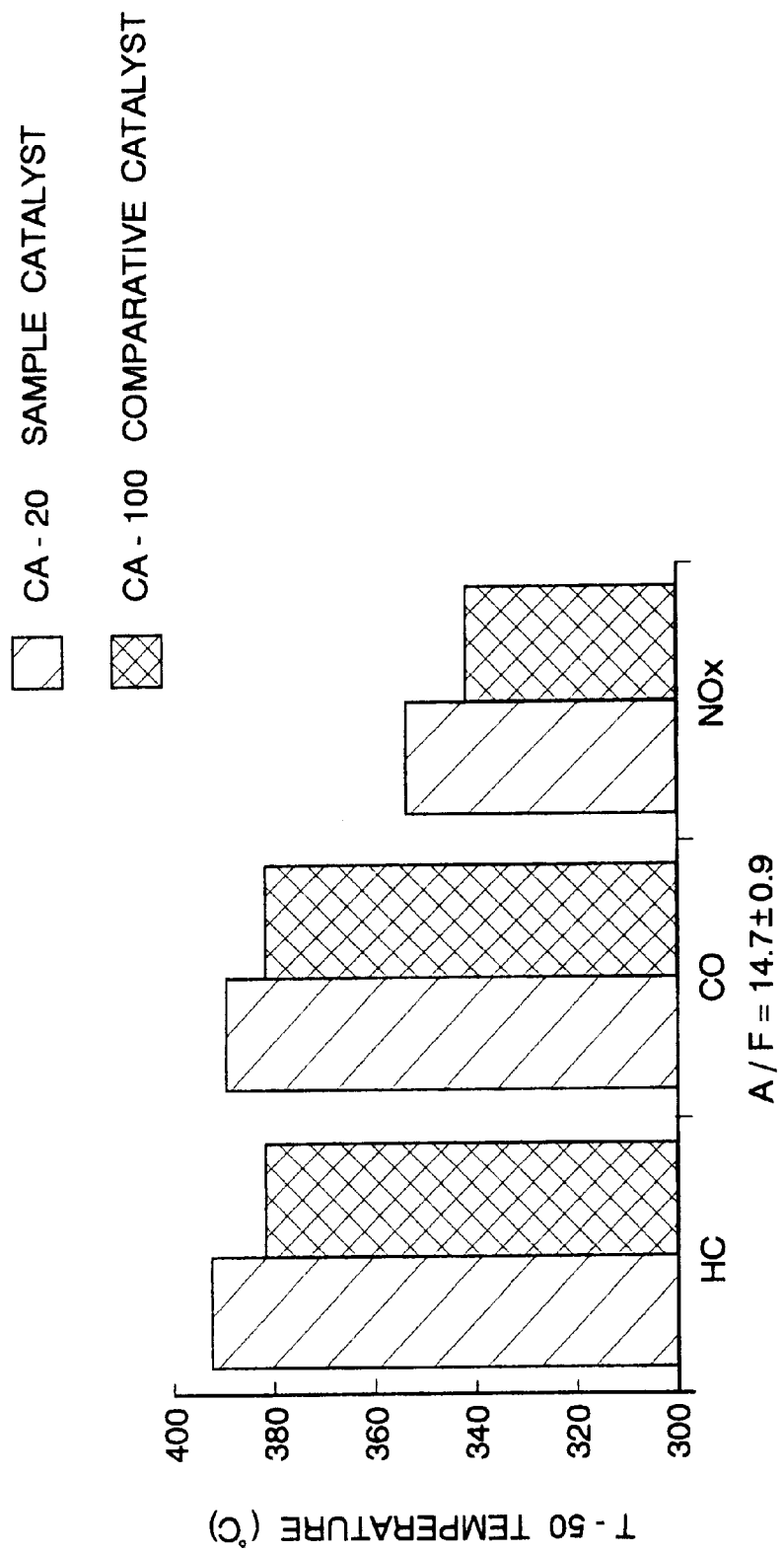
FIG. 18 is a graphical diagram showing T-50 temperature of sample and comparative catalysts containing Pt and Rh as noble metals.
Figure 19:
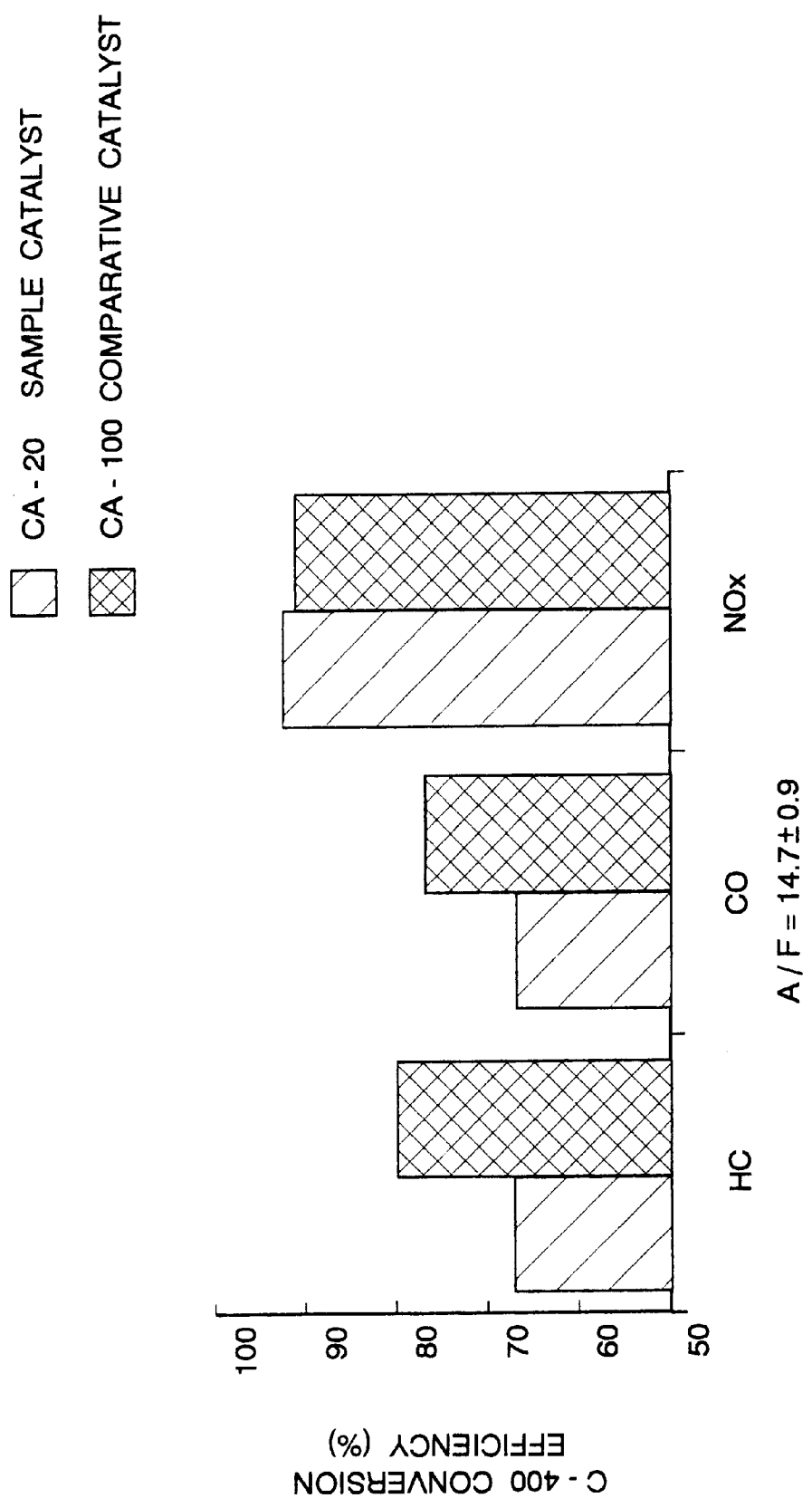
FIG. 19 is a graphical diagram showing C-400 conversion efficiency of the sample and comparative catalysts containing Pt, Pd and Rh as noble metals.
Figure 20:
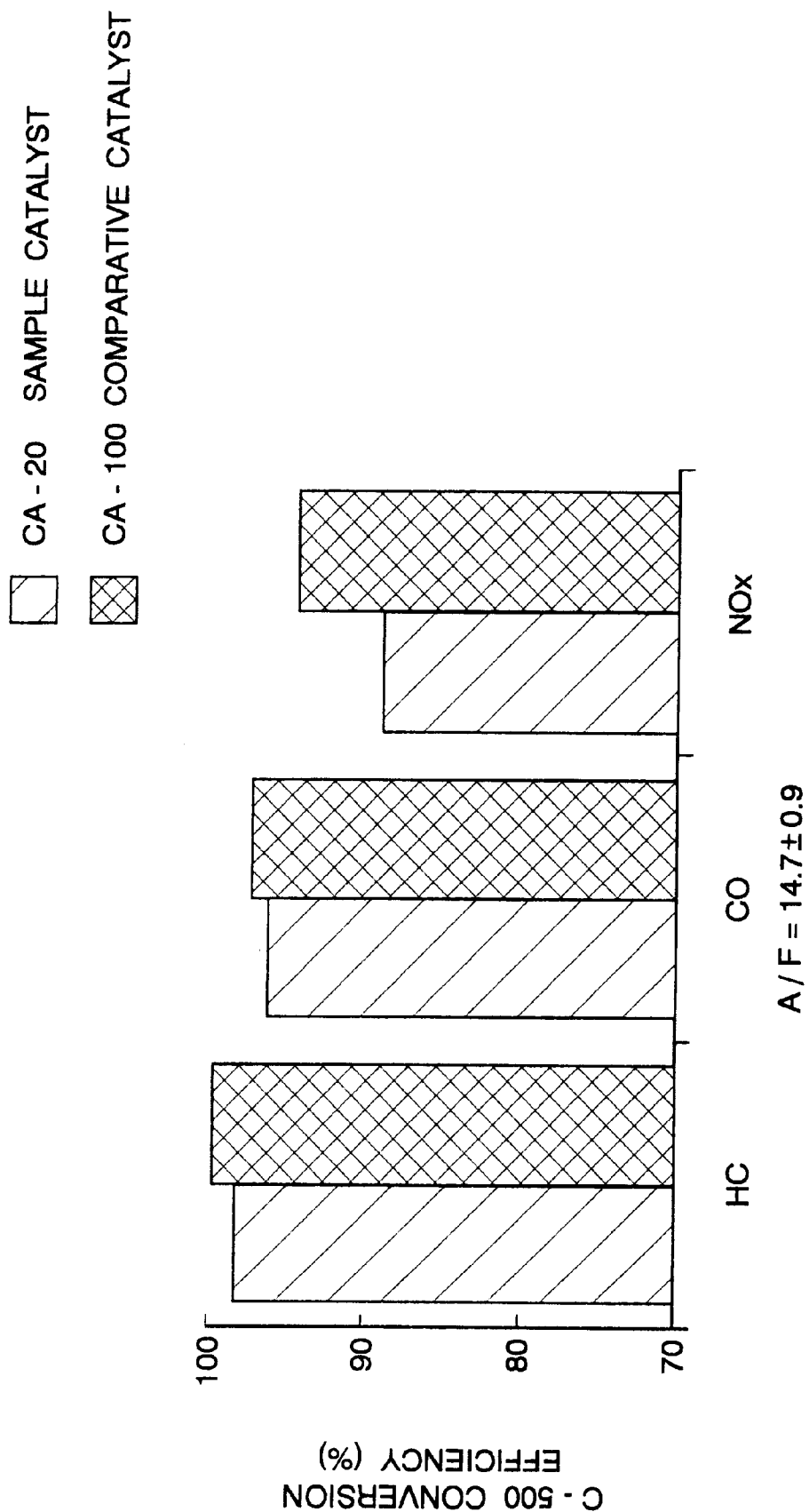
FIG. 20 is a graphical diagram showing C-500 conversion efficiency of the sample and comparative catalysts containing Pt and Rh as noble metals.

As apparent from FIGS. 18–20, the CA-20 sample catalyst presents higher T-50 temperatures for all of hydrocarbons (HC), carbon monoxide (CO) and nitrogen oxides (NOx) than the CA-100 comparative catalyst. Further, excepting C-400 conversion efficiency for nitrogen oxides, the CA-20 sample catalyst presents significantly lower C-400 and C-500 conversion efficiency for hydrocarbons (HC) than the CA-100 comparative catalyst and the C-20 sample catalyst containing palladium (Pd) (see FIGS. 16 and 17). This proves that the catalysts containing no palladium (Pd) does not provide improvement of T-50 temperature and C-400 and C-500 conversion efficiency. This is because, while palladium (Pd) provides an excellent catalytic function in the form of oxides and the oxygen storage effect of ceria enhances catalytic activity, platinum (Pt) provides an excellent catalytic function not in the form of oxide but in a metallic state and is not affected by the oxygen storage effect of ceria, and because a ceria coating makes platinum easy to be oxidized or isolates palladium from contact with exhaust gases.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An exhaust gas purifying catalyst for purifying exhaust gases from an automobile engine, said exhaust gas purifying catalyst comprising:

ceria particles;

palladium oxide particles dispersed around and supported on said ceria particles; and a ceria coating formed on a surface of said ceria particles to cover said palladium oxide particles.

2. The exhaust gas purifying catalyst as defined in claim 1, wherein the weight ratio of said ceria particles to a total of said ceria particles and ceria in said ceria coating is between 20 and 30%.

3. A process of producing an exhaust gas purifying catalyst comprised of a palladium oxide and a cerium oxide for purifying exhaust gases from an automobile engine, said catalyst producing process comprising the steps of:

supporting noble metals including at least palladium on a ceria particle;

performing heat-treatment to fix said noble metals to said ceria; and forming a ceria coating on said ceria particles with said noble metals fixed thereto.

4. The process of producing an exhaust gas purifying catalyst as defined in claim 3, wherein said ceria particles are brought into contact with a solution of said noble metals to support said noble metals on said ceria particles.

5. The process of producing an exhaust gas purifying catalyst as defined in claim 4, wherein alumina particles are included in a mixture of said ceria particles and said mixture is brought into contact with a solution of said noble metals to support said noble metals on said ceria particles and said alumina particles.

6. The process of producing an exhaust gas purifying catalyst as defined in claim 3, wherein said ceria particles with said noble metals fixed thereto is brought into contact with a solution of a cerium oxide.

7. The process of producing an exhaust gas purifying catalyst as defined in claim 3, and further forming a coating of said ceria particles with said noble metals fixed thereto over a catalyst support before said heat-treatment.

8. The process of producing an exhaust gas purifying catalyst as defined in claim 7, wherein said coating layer of said ceria particles with said noble metals fixed thereto is impregnated with a solution of said cerium oxide and burnt thereafter.

9. The process of producing an exhaust gas purifying catalyst as defined in claim 3, wherein the weight ratio of an amount of said ceria particles for supporting said noble metals to a total amount of said ceria particles for supporting noble metals and cerium oxide supported on said ceria particles with said noble metals fixed thereto is between 10 and 30%.

10. The process of producing an exhaust gas purifying catalyst as defined in claim 3, wherein the weight ratio of an amount of said ceria particles for supporting said noble metals to a total amount of said ceria particles for supporting noble metals and said cerium oxide supported on said ceria particles with said noble metals fixed thereto is between 20 and 30%.

11. An exhaust gas purifying catalyst for purifying exhaust gases from an automobile engine, said exhaust gas purifying catalyst comprising:

ceria particles;

alumina particles;

palladium oxide particles dispersed around and supported on said ceria particles and said alumina particles; and a ceria coating formed on surfaces of said ceria particles and said alumina particles to cover said palladium oxide particles.

* * * * *